US006591199B2

(12) United States Patent
Tremblay et al.

(10) Patent No.: US 6,591,199 B2
(45) Date of Patent: Jul. 8, 2003

(54) METHOD AND SYSTEM FOR ACQUISITION, MONITORING, DISPLAY AND DIAGNOSIS OF OPERATIONAL PARAMETERS OF ELECTROLYZERS

(75) Inventors: Gilles J. Tremblay, Montréal (CA); Said Berriah, Montréal (CA); David Brillon, Laprairie (CA); Thierry Guena, Montréal (CA)

(73) Assignee: Recherche 2000 Inc., Quebec (CA)

( * ) Notice: Subject to any disclaimer, the term of this patent is extended or adjusted under 35 U.S.C. 154(b) by 84 days.

(21) Appl. No.: 09/829,770

(22) Filed: Apr. 10, 2001

(65) Prior Publication Data

US 2001/0039481 A1 Nov. 8, 2001

Related U.S. Application Data (60) Provisional application No. 60/196,165, filed on Apr. 11, 2000.

(51) Int. Cl.$^7$ ............................................. G06F 15/00
(52) U.S. Cl. ........................... 702/35; 702/35; 714/712
(58) Field of Search ..................... 702/35, 183, 185, 702/33; 429/17, 19, 23; 714/746, 712; 700/31; 320/116, 150, 164

(56) References Cited

U.S. PATENT DOCUMENTS

| 4,532,018 A | 7/1985 | Wright et al. |
| 5,047,961 A | 9/1991 | Simonsen ..................... 702/63 |
| 5,584,291 A | 12/1996 | Vapola et al. |
| 5,748,508 A | 5/1998 | Baleanu ........................ 703/13 |
| 5,923,148 A | 7/1999 | Sideris et al. ............... 320/116 |
| 5,945,229 A | 8/1999 | Meltser |
| 6,105,149 A | 8/2000 | Bonissone et al. |

FOREIGN PATENT DOCUMENTS

| EP | 0 335 380 | 10/1989 |
| WO | 96/07958 | 3/1996 |
| WO | 97/15839 | 5/1997 |
| WO | 00/10059 | 2/2000 |

OTHER PUBLICATIONS

S. Theodoridis et al., "Optimal Path Searching Techniques", *Pattern Recognition*, pp. 291–298.
D.A. Denton, et al., "Developments in Coatings for Metal Anodes", *Modern Chlor–Alkali* vol. 2, pp. 215–232.
Y. Ogata et al., "Effects of the Brine Impurities on the Performance of the Membrane–Type Chlor–Alkali Cell", *Electrochem Soc.*, Vo. 136, No. 1, pp. 91–95.
K. L. Hardee, "A Simple Procedure for Evaluating Membrane Electrolyzer Performance", pp. 235–242.
B.V. Tilak et al., "Electrolytic Sodium Chlorate Technology: Current Status", *Electrochemical Society Proceedings*, vol. 99–21, pp. 8–11.
Donald L. Caldwell, "Production of Chlorine", pp. 105–162.

*Primary Examiner*—Kamini Shah
(74) *Attorney, Agent, or Firm*—Merchant & Gould P.C.

(57) ABSTRACT

The present invention concerns a method and system for monitoring electrolyzer performances and for diagnosing and predictive identification of faults and events that could affect the manufacturing processes that uses electrolyzers. The system has a plurality of acquisition and transmission units, each of the acquisition and transmission units measuring a plurality of variables related to a respective electrolyzer and for transmitting these variables; a database and data management unit for recording the variables transmitted by each of the acquisition and transmission units; a monitoring unit for monitoring the variables; and an intelligent data analysis and fault diagnosis unit for analyzing the variables and diagnosing events. All of the units are interconnected through a communication unit.

19 Claims, 6 Drawing Sheets

METHOD AND SYSTEM FOR ACQUISITION, MONITORING, DISPLAY AND DIAGNOSIS OF OPERATIONAL PARAMETERS OF ELECTROLYZERS

This application claims benefit of provisional No. 60/196,165 filed Apr. 11, 2000.

FIELD OF THE INVENTION

The present invention concerns a method and apparatus for monitoring electrolyser performances and for diagnosing and predictive identification of faults and events likely to affect the manufacturing processes that uses those electrolysers.

BACKGROUND OF THE INVENTION

An electrolyser is used to convert a lower value chemical (e.g.: NaCl) into a higher value chemical (e.g.: $NaCl_3O$). These types of electrolysers can be found in different areas of the chemical industry, such as for the production of sodium chlorate, caustic soda and chlorine. In an electrolyser, there is a number of anodes and cathodes. An oxidation reaction takes place at the anode and a reduction reaction takes place at the cathode. The rate of chemical reaction is directly related to the current. An ion exchange membrane can be used to separate the anodic reaction from the cathodic reaction. The electrolysis of sodium chlorate is usually carried out in an undivided electrolyser. The overall reaction is described as: $NaCl + 3\ H_2O \rightarrow NaClO_3 + 3\ H_2$ This reaction requires 6 electron per sodium chlorate produced. It involves a multi-step reaction, taking place at the anode and in the bulk of the reactor. The article from B. V. Tilak and C. P. Chen B. V. Tilak and C. P. Chen; 'Electrochemical Society Proceedings'; vol 99–21; 1999; pp.8; 'Electrolytic sodium chlorate technology: current status' gives an overview of the technology. The electrolysis of chlorine and caustic soda can be achieved simultaneously in the same electrolyser. Caustic soda is formed is the cathode compartment. The chlorine is formed at the anode compartment. In modern chlor-alkali electrolyser, the separation between the anodic and the cathodic reaction is achieved with an ion exchange membrane. This membrane ideally only allows the passage of sodium from the anodic compartment to the cathodic compartment. The article from D. L Caldwell (D. L. Caldwell; Comprehensive Treatise of Electrochemistry'; Vol 2; 1981; pp 105; 'Production of chlorine'; Editor: O'M. Bockris, B. E. Conway, E. Yeager and R. E. White; Publisher: Plenum Press, New York) gives more detail about this technology.

A fuel cell is a special type of electrolyser that is used as a generator. It converts the chemical energy of a fuel into electrical energy. Fuel cells are composed of a number of anodes and cathodes. It is at the anode that the fuel is electrochemically oxidized and it is at the cathode that the oxidant is electrochemically reduced. Electrons are generated at the anode and flow through an external load to the cathode. Ions flow between the anode and the cathode in an electrolyte to complete the circuit. There are different fuel cell technologies. The proton exchange membrane fuel cell (PEMFC) is one of them. The PEMFC is also known as a solid polymer electrolyte (SPE) fuel cell. In such fuel cell, a thin proton exchange membrane has on one of its faces an anode and on the other a cathode. Hydrogen is fed to the anode and reacts to produce protons. These protons move to the cathode where they react with oxygen to produce water. The overall reaction is: $H_2 + \frac{1}{2}O_2 \rightarrow H_2O$ The ways the anodes and cathodes are connected differ according to the technology. The electrodes can be connected in parallel, in series or in a combination thereof.

One of the problems associated with the monitoring of the electrolysers is the extremely hostile conditions in which they operate. This makes data acquisition difficult and unreliable. Furthermore, it is essential to monitor these electrolysers in order to maximize the production rate and quality while still maintaining a minimal operating cost. Looking at the overall production performance does not allow the operator to discover that a unit cell is underperforming and should be changed. There is a growing need from the industry to be able to diagnose the plant on a macroscopic level as well as on an individual cell unit level in order to correctly assess the cause of any performance decrease and determine what is the more economic solution to deal with the problem so identified. Usually, a plant operator monitors the electrolysers by measuring manually the pertinent parameters as voltage and current. Then, the data records are sent to the plant engineer, and by using his expertise and different data analysis he can find the symptoms that may cause the faults. This procedure is time consuming and imprecise, especially when the faults symptoms are defined by a large amount of data. For this reason, it is useful to have a system that can automatically and accurately monitor the electrolysers and help to quickly identify the problems that can occur in such plants to increase the production performance.

Known in the art is U.S. Pat. No. 5,945,229, to General Motors Corporation entitled "Pattern Recognition Monitoring of PEM Fuel Cell". The CO concentration in the $H_2$ feed stream to a PEM fuel cell stack is monitored by measuring current and voltage behaviour patterns from an auxiliary cell attached at the end of the stack. The auxiliary cell is connected to the same oxygen and hydrogen feed manifolds that supply the stack, and discharges through a constant load. Pattern recognition software compares the current and voltage patterns from the auxiliary cell to current and voltage signatures determined from a reference cell similar to the auxiliary cell and operated under controlled conditions over a wide range of CO-concentrations in the $H_2$ fuel stream. However, one of the problems associated with this method is that the reference signature is taken at ideal operating conditions for a fuel cell. No allowance is made for the variation in the operational characteristics of the fuel cell during the life of the fuel cell.

Also known in the art is U.S. Pat. No. 6105149 to General Electric Company entitled "System and Method for Diagnosing and Validating a Machine using Waveform Data". In this patent, a method and a system are developed to diagnose faults in devices such as computed tomography or magnetic resonance imaging machines. The faults are diagnosed by analysing waveform data obtained from the machines. A database containing the faults symptoms and corresponding repair actions are used to build classification rules. These rules are used to analyze new waveform data.

U.S. Pat. No. 5,584,291 to Instrumentarium entitled "Method for recognizing and identifying emergency situations in an anaesthesia system by means of a self-organizing map" describes a method of identifying emergency situations in an anaesthesia system by measuring a plurality of variables associated with an anaesthesia delivery. The measurement values of the measured variables are formed into pattern vectors characterizing the instantaneous states of the system.

Other fault diagnosis methods applied in plants that uses electrolysers can be found in the following patents: U.S. Pat.

No. 4,532,018 to Olin Corporation entitled: "Chlor-alkali cell control system based on mass flow analysis", U.S. Pat. No. 5,015,345 to Denora Permelec entitled: "Method for detecting defective ion exchange membrane in monopolar and bipolar electrolysers" and European patent application EP1069636A1 to General Motors Corporation entitled: "Fuel cell stack monitoring and system control".

SUMMARY OF THE INVENTION

It is an object of the present invention to provide a system and apparatus that gives valuable information relative to the performance of electrolysers in a chemical manufacturing plant and helps to diagnose the origin of performance fluctuations that sometimes occur during the production.

In accordance with the invention, this object is achieved with a method and apparatus for monitoring electrolyser performances and for diagnosing and predictive identification of faults and events that could affect the manufacturing processes that uses electrolysers. The system comprises:

a) a plurality of acquisition and transmission units, each of said acquisition and transmission units measuring a plurality of variables related to a respective electrolyser and for transmitting said variables;

b) a database and data management unit for recording the variables transmitted by each of said acquisition and transmission units;

c) an intelligent data analysis and fault diagnosis unit for analysing said variables and diagnosing events;

wherein each of said units are interconnected through a communication unit.

In accordance with a preferred embodiment of the invention, the system includes: a data acquisition and transmission unit which acquires parameters such as voltage, current and temperature from the cells. These convert the analog signals into digital data streams. Those data sets are concentrated and transmitted by the communication unit to the database and data management unit, which records and formats them into data rows files. A processing and monitoring unit that displays desired data trends and added value data, which are pre-processed and filtered based on a user-defined manner. In addition, the monitoring units displays alarms, recommended actions and generates reports. The data rows are fed to the monitoring unit from the database and management unit by making export requests to the communication unit. An intelligent data analysis and faults diagnosis unit tracks the evolution of defined pertinent parameters. This unit prevents faults and events before they occur by isolating data trends signatures. The plant engineer or the plant analysis lab defines these faults signatures in advance based on their experience or based on a prior knowledge for the characteristics of the electrolysers in the plant. All the units are constructed around the communication unit that simplifies the importing and exporting of data and information between the system units and a remote third party software or hardware through a network.

DETAILED DESCRIPTION OF THE INVENTION

In the present invention, a unit cell is defined as the smallest group of anodes and cathodes that are connected to the same current feeder. A monopolar electrolyser is then considered as a single cell unit and a bipolar electrolyser is considered as a number of unit cells. A voltage reading is measured for each unit cell. The present system allows the detection of faults and events in each unit cell.

The present invention concerns an acquisition, monitoring and diagnosis system and method that helps the tracking and the optimization of the performance of electrolysers in manufacturing chemical plants.

In an electrolyser there are a number of anode and cathodes. A membrane can be used to separate the anodic reaction from the cathodic reaction. The way the anodes and cathodes are connected differ according to the technology used. The electrodes can be connected in parallel, in series or in a combination thereof.

The system and method of the present invention allows the monitoring of each unit cell. There are different indicators that can be used to assess electrolyser performance. The voltage and the current efficiency are two of them. The voltage is very sensitive to any changes occurring in the operating conditions. With the right equipment, it can easily be measured for each unit cell. The current efficiency is more difficult to determine. It requires measuring concentrations in the solution coming from the unit cell. Quite often, it is only possible for a group of unit cells. There are many examples in the literature that use these two parameters to determine the performance of a new type of electrode (see, for example, D. A Denton, J. T. Desouza, J. H. Entwisle, D. Lee, H. G. Wilson; Modern Chlor-Alkali Technology; vol. 2; P215; Developments in coatings for metal anodes; Ed: R. W. Curry; The Royal Society of Chemistry publication) or the effect of impurities on the performances (Y. Ogata, T. Kojima, S. Uchiyama, M. Yasuda and F. Hine; J. Electrochem. Soc.; vol. 136; 1989;91 "Effects of the brine impurities on the performance of the membrane type chlor-alkali cell", M. Nakao and H. Miyake Modern Chlor-Alkali Technology; pp. 185; "Advanced cell operation with flemion membrane"; Ed: R. W. Curry; Pub:The Royal Society of Chemistry).

Figure 1:
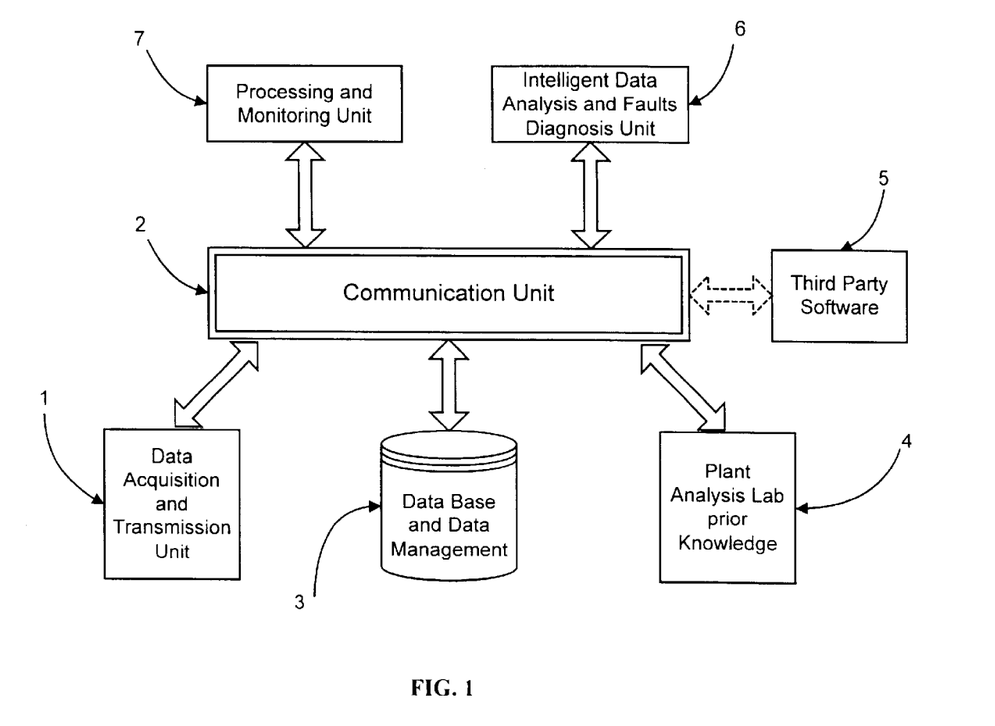
FIG. 1 shows the global structure of the acquisition and diagnosing system for the electrochemical cells according to the present invention.

FIG. 1 represents the global structure and the connections between the different units of the system according to a preferred embodiment of the invention. In the core of the system there is the communication unit 2, which simplifies the dialog and the exchange of data and information between the different units. This unit is built under a server client communication protocol. In the preferred embodiment, the public domain OPC (OLE for Process Control) provided with Microsoft Windows NT™ or 2000™ operating system used to run the software units is used. The communication unit 2 acts as a server to the other units, which are defined as clients. The data acquisition and transmission unit 1 contains the hardware devices that acquire data from the cells and transmit them to the other units. It includes electronic boards 8 called MODA (Module Acquisition) that measure at least one of the following cell electrodes voltage, total cell voltage, cell group voltage, and may further be adapted to measure temperatures and gas concentrations measured by adequate sensors. The MODA contains A/D converters that convert the analog signals into digital signals with a defined sampling rate; memory buffers; digital filters that eliminates the undesired noise and, in the core, a microcontroller used to run the acquisition and transmission procedures. The components of the acquisition units 8 are contained in a hermetic box that protects them from the surrounding hostile environment. All the data issued from the MODA devices is sent via optical fiber wires with respect to the transmission protocol to the concentration device 9, called the FOCOM (Fiber Optic Communication Module). The FOCOM is a board plugged in a personal computer or terminal; it receives, concentrates and formats the data streams into data rows to make them recordable by the database and data management unit 3. The main function of this module is to record the data to make historical data rows that could be exported to the other units. The user can access any data record by making the adequate SQL request through the communication unit OPC server to the database. The results of the requests are displayed by the processing and monitoring unit 7.

Figure 3:
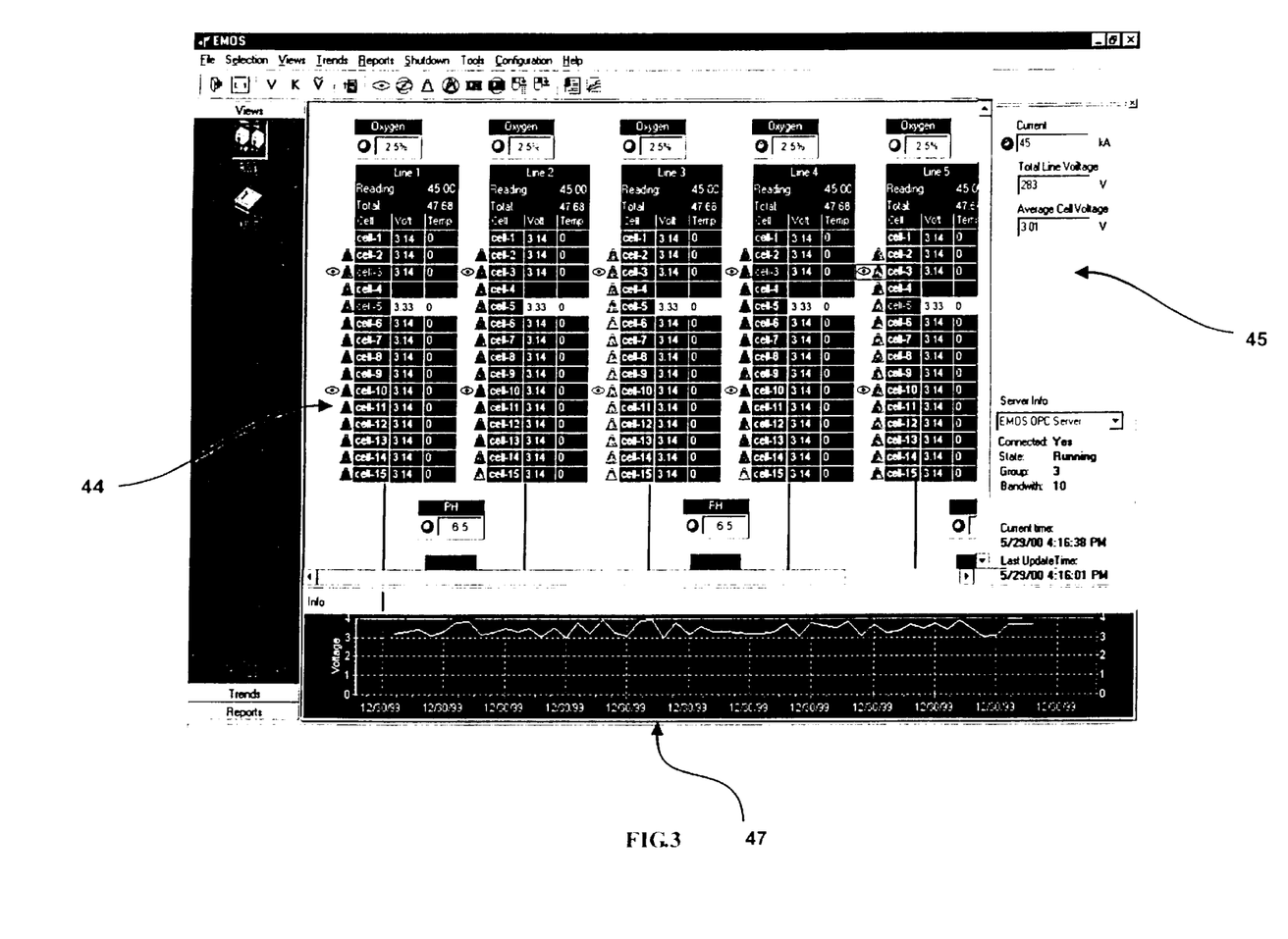
FIG. 3 shows a schematic example layout of the processing and monitoring unit shown in FIG. 1.

According to the preferred embodiment of the invention, the processing and monitoring unit 7 is a multi level monitoring graphical user interface; an example of that interface is shown in FIG. 3. The basic monitoring level 44 is a representation of the plant layout with the monitored cells. For each cell, the acquired measurements requested by the user are displayed and refreshed on each time step (also defined by the user). In that level 44 the user could also define a threshold for each variable. Consequently, when the variable approaches that threshold, flag alarms will be displayed on the screen. Also on that level 44, other desired characteristics 45 such as the current value for each line and the mean voltage for a cell could be shown as well. A higher-level 47 displays defined variable trends reflecting the evolution in a time window of those variables. In addition, value added data such as polarization curves; filtered signals and analysis reports could be accessed by that interface.

The intelligent data analysis and faults diagnosis unit 6 is a tool that easily and precisely makes the detection and prediction of faults and anomalies that could happen in the monitored devices and proposes the actions to take to avoid those anomalies. The fault diagnosis is based on classification rules defined in accordance with a prior knowledge of process functioning. This unit is preferably embodied by a software package.

Figure 2:
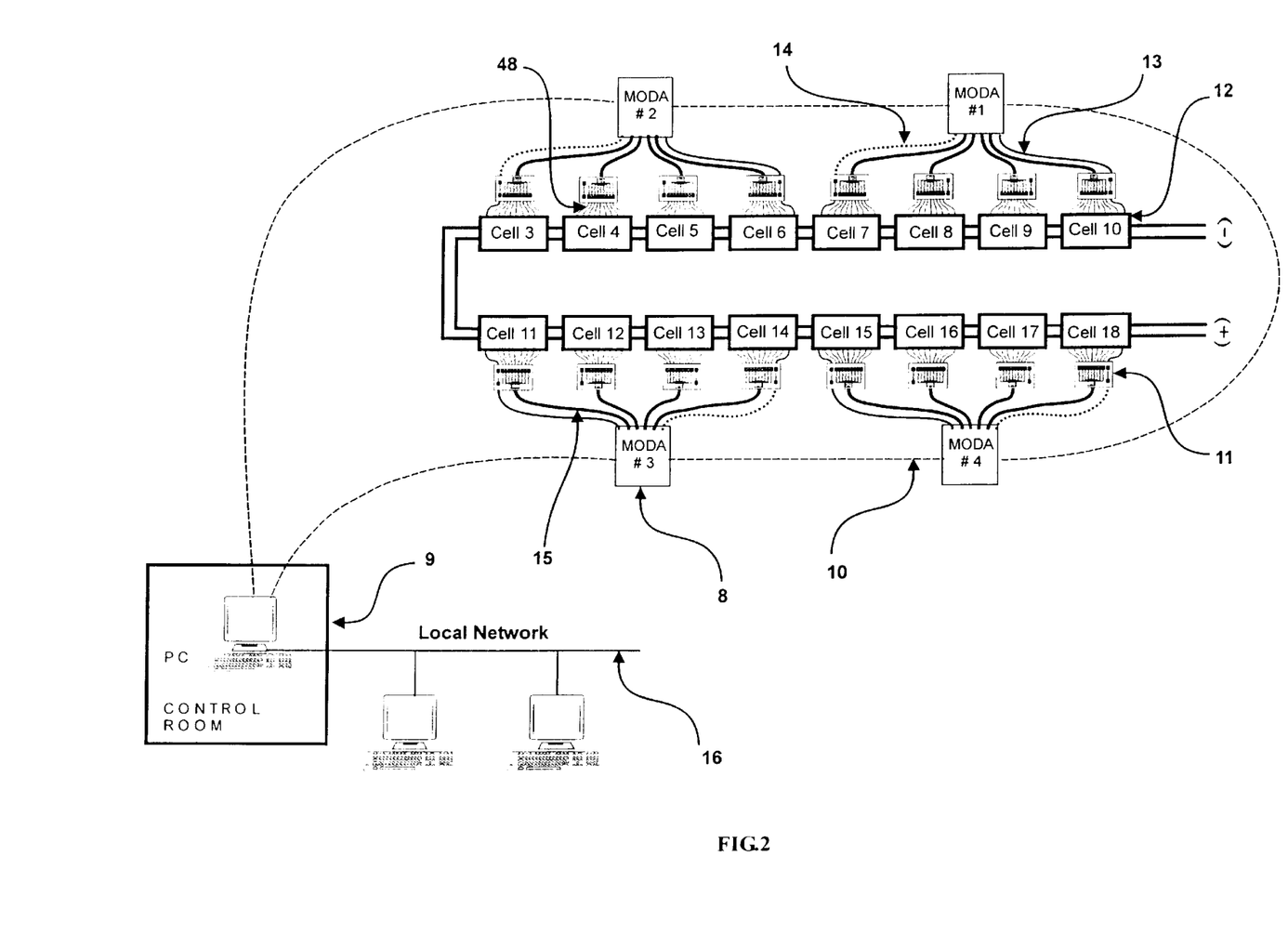
FIG. 2 shows an example of the interconnexion between the acquisition and the transmission units for a plant according to the present invention.

An example of the connection between the different units in a plant is shown on FIG. 2. A production line 18 has a number of cells 12; each cell 12 contains 8 cell units. In this case, each electrode voltage is measured by a metal wire 48. To increase the accuracy of the measuring values and the minimization of noise, the wires 48 are concentrated in a multicable protected cable 15 through the TFP10 (Terminal Fuse Protection 10) device 11. In this plant layout, each acquisition device 8 monitors 4 cells. The multicables coming from each cell are connected to the inputs of the acquisition unit 8. Each MODA multiplexes the input signals by a series of relays in a sequence. Then, the input signals are fed to electronic isolators (high current isolation to 1000 ground volts), which produces a proportional analog signal. Those analog signals are converted to digital ones by an A/D converter. The acquisition units could advantageously process other inputs like temperature or chemical readings from sensors, which will be directly connected to the A/D converters. The acquisition units 8 are powered directly by the cell 13; this is advantageous because it obviates the need for external power lines.

The data streams are then transmitted through the communication optical fiber loop 10, which links all the MODA acquisition units to the control personal computer 9. The transmitted data streams are processed by the unit 9, which is basically a device with memory buffers built around a processor. This unit formats, stores and send the data streams to the database, which creates the data row files records. Also the unit 9 is able to acquire a 4–20 mA current input that feeds the production line. The data files stored in the database could be accessed by any terminal in the plant through the local network 16 by making the adequate exporting request to the OPC communication protocol 2.

Figure 4:
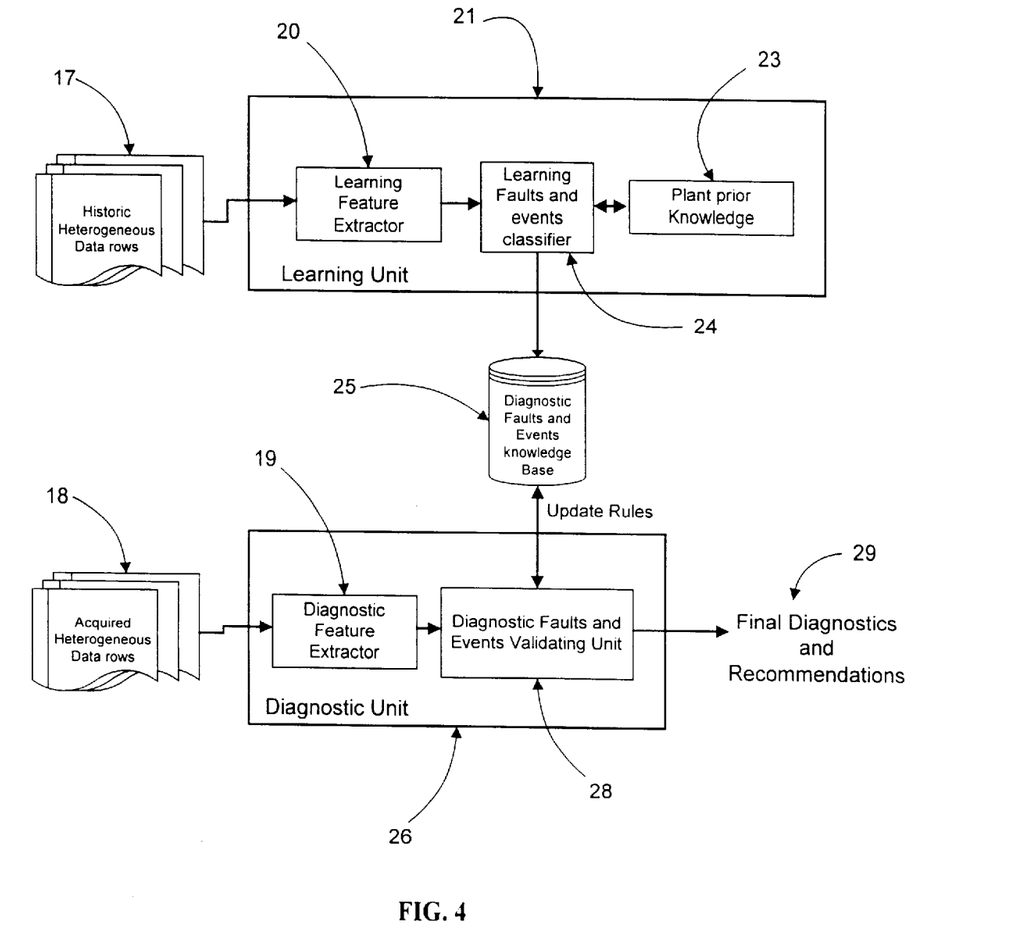
FIG. 4 shows the structure of the intelligent data analysis and faults diagnosis unit shown in FIG. 1.

FIG. 4 shows block diagrams that set forth the components of the intelligent data analysis and fault diagnosis unit 6. It includes three main components: The learning unit 21, the diagnostic unit 26 and the faults and events knowledge base 25.

The learning unit 21 obtains historic data files 17 taken from the database unit 3. Those data files 17 (called also training data) contain values of electrical and chemical parameters acquired by the acquisition unit 1 and other parameters deemed relevant for the fault signatures learning and extraction. The data files are preferably organized in a row-column fashion, where each row represents the time step acquisition and each column indicates the parameter type. The learning unit 21 includes a learning feature extractor 20 for extracting the most important features from the data sets. Those features are the most representative of the plant state. The generated features are then sent to the learning faults and events classifier 24, which associates and classifies them into events classes. This association is done by respect to the plant prior knowledge. The resulting classification rules are then stored in the diagnostic faults and events knowledge base 25.

Figure 5:
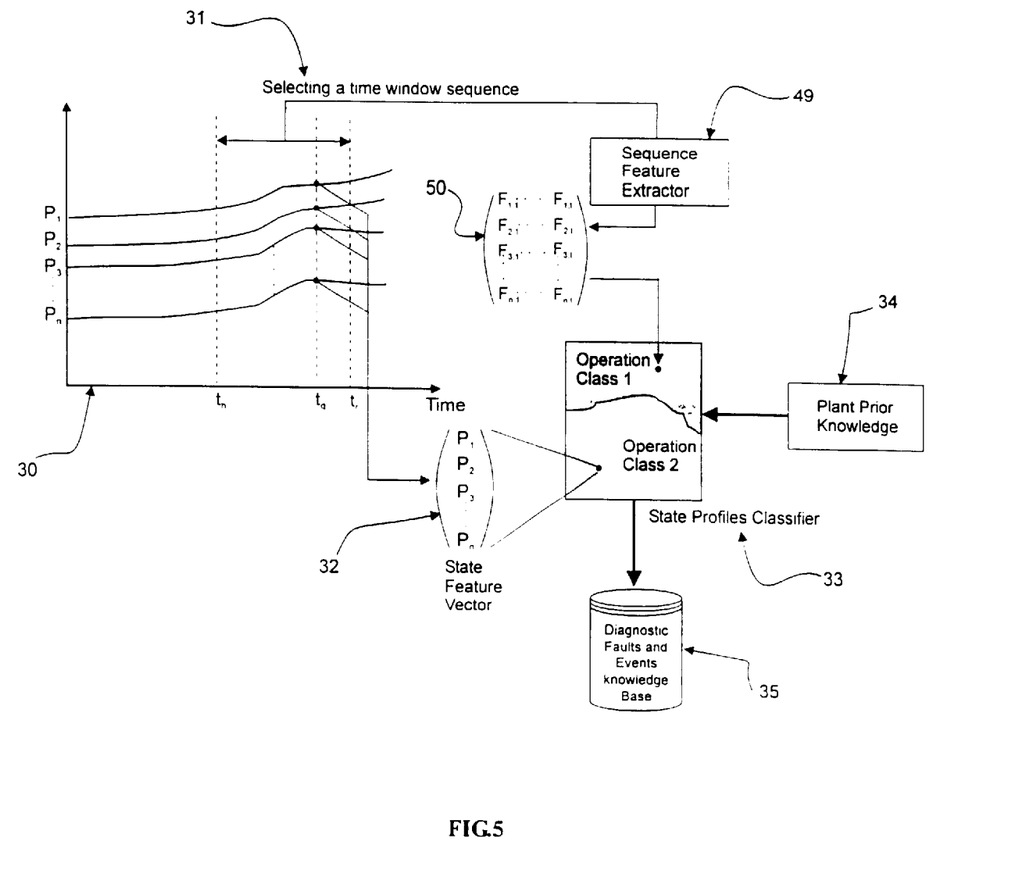
FIG. 5 shows the structure of the learning feature extractor and the learning faults and events classifier shown in FIG. 3.

FIG. 5 depicts in detail the interaction between the different components of the learning unit 21. As mentioned previously, the learning data files 17 are organized in a manner that the rows represent the acquisition time and columns the parameters values as shown by 30. In the preferred embodiment of the invention, the faults signatures and the process operation profiles could be isolated by doing two levels of feature extraction. The basic level is to learn the Instantaneous process state at each time step tq; this is done by tracking the state vector 32. The state vector contains the pertinent process parameters $[P_1, P_2, P_3 \ldots P_n]$, which defines a global operation process state at the step time tq. An operation profile or a fault signature could be defined not just by the state vector 32 but also by the evolution of that vector in a certain time window $[t_h, t_r]$ 31. The sequence feature parser 49 performs different numerical analysis or data pre-processing on the time sequence to generate the feature matrix 50. For each parameter time sequence $P_i \in [t_h, t_r]$, the sequence feature parser 49 performs time domain analysis, frequency analysis and data pre-processing and obtain for that time series, a feature vector. All the feature vectors are concatenated to build the feature matrix 50. The extracted time domain features are values such as: the time sequence average, the peak to peak distance of the time sequence, the time sequence standard deviation, the integral and the derivative. The extracted frequency domain features are values such as: the maximum amplitude of the power spectrum and the frequency of that maximum. Some events could be defined just by the evolution of one pertinent parameter in the time window $[t_h, t_r]$. In that case, one feature vector for the parameter is generated and learned. This is usually called local learning.

Other features are generated by performing pre-processing operations such as filtering the data for eliminating outliers (points lie far from the mean value) or removing undesired frequencies from the frequency spectrum. Other pre-processing operations such as data normalization by mean, by variance or normalization of a parameter versus another one, could also advantageously be done. An example of this kind of pre-processing is the normalization of voltage versus current. In a day-to-day electrolysis plant operation, the current may vary to respond to a new production constraint. Changing the current will also affect the voltage. The voltage variation related to the current change has to be ignored during the analysis of the voltage trends. To somewhat simplify the analysis; it is convenient to estimate what would be the voltage if the current had not changed. Consequently, it becomes easier to see any voltage variation that is not related to a current change. A simple approach to the normalization of voltage versus the current consists in assuming that the relationship between voltage and current is linear and that only the slope can change.

The formula used to calculate the normalized voltage is then:

$$V_{I_{ref}} = (V - Vo) \cdot \frac{I_{ref}}{i} + Vo$$

where V and i are the voltage and the operating current; $V_{I_{ref}}$ is the normalized voltage; $I_{ref}$ is the current used for the normalization and Vo is the intercept of the V versus I linear relationship. Other types of normalization are possible and useful. The voltage can be normalized versus the temperature or the electrolyte concentration. Quite often, empiric formulas or tables are used to normalize the voltage versus temperature or the electrolyte concentration. Another useful method for analysing the electrolyser state is the polarization curves. They are obtained by adjusting the current to a number of values and recording the corresponding voltage. During a polarization curve, it is best to keep the other parameters constant (e.g.: temperature, electrolyte concentration). If it is not possible, adjustments have to be made to compensate for these variations. The polarization curves give the relationship between current and voltage V=f(I). In chlor-alkali, the relationship is often described as:

$$V_{cell} = \text{Anode potential} + \text{cathode potential} + iR_{membrane} + iR_{electrolyte} + iR_{hardware}$$

The cell voltage represents the sum of many different voltage losses related to the different parts of the system (e.g.: the cathode, the anode, the membrane and the electrolyte). These voltage losses are function of current but also of the characteristics of the different parts of the system. A lot of information can be extracted just by following the variations in the current voltage relationship. Different methods for doing so can be used. The simplest method consists in doing a linear regression with the linear part of the polarization curve. Then a change in the slope and the intercept can be used to detect a variation in performance. As an example: In the chlorate industry, an increase in the slope of the polarization curve is generally due to cathode deposit, whereas an increase in intercept is usually attributed to anode loss of coating. A more advanced method for analysing variation in the polarization curve consists in doing a non-linear regression of the polarization curve. In the chlor-alkali and the chlorate industry, the polarization curves can be fitted with the following equation:

$$V = a + b \cdot I + c \cdot log(I)$$

where a is related to the standard potential and the exchange current as well as the Taffel slope;

b is the sum of all the resistances in the cell (hardware+electrolyte);

c is related to the Taffel slopes.

K. L. Hardee (K. L. Hardee; 'Modern Chlor-Alkali Technology'; vol 6; 1995; pp.234; 'A simple procedure for Evaluating membrane electrolyser performance'; Edior: R. W. Curry; Publisher: The Royal Society of Chemistry) has used this method in the chlor-alkali to discriminate between a few situations. He has not considered looking at how these parameters will evolve in time. If a hole occurs in a membrane, this will lead after some time to the destruction of the anode coating near the hole. The polarization curve then reflects the hole but also the partial coating destruction.

The relative changes of these three coefficients gives a signature that is particular to a given situation. Comparing these changes with known signatures makes it possible to discriminate between a numbers of situations (e.g.: anode corrosion, anode poisoning, cathode deposit, etc). With this method, it is also possible to estimate the state of advancement for different situations such as the loss of anode coating. Other features could be use to construct the feature matrix 50 but those cited previously are the main ones used in the context of the present invention. Each state vector 32 and feature matrix 50 is then associated with a label; this one defines the feature matrix membership to an operation class or fault signature based on the plant prior knowledge 34. The state profiles classifier 33 performs this operation by using geometric classification algorithms as the well-known neural network supervised self-organizing maps algorithm (also called the kohonen mapping). In the preferred embodiment of the invention the former one is used but the latter one perform as well.

The self-organizing map classification algorithm maps non-linear statistical dependencies between high-dimensional measurement data into simple geometric relationships on a usually two-dimensional grid map. The mapping is, furthermore, done in such a way to preserve the topological relations between the input feature vectors and matrices. Due to that topology preserving property of the map, similar feature vectors corresponding to similar states of the process are mapped close to each other resulting in clusters on the map. Clusters corresponding to certain faults are created on the map and those clusters could be defined as dangerous areas. Visualization techniques such as color-coded maps or grey level maps could identify this clusters. More details on the learning by the self-organizing algorithm could found in the following publication: Kohonen, T. "The self-Organizing Maps", proceeding of the IEEE, 78, pp. 1464–1480, and Kohonen, T. "Self Organized Formation of Topologically Correct Feature Maps", Biological Cybernetics, 43, p.p. 59–69.

The classification assignments are then input to the Diagnostic Faults and Events Knowledge base 35. The rules are composed by a condition part that includes a conjunction of classification assignments and a consequent part that contains the recommendations as a result of the condition part. The recommendations, the identified events and problems depend on the electrolyser technology. In the chloralkali industry, there are many event or problems that will affect the performance of the electrolytic process. Some of those problems are: anode loss of coating, cathode loss of coating, cathode poisoning, electrode passivation, blockage in cell or liquor circuit, problem with the purification of the feed (e.g.: impurities such as sulphate, Mg, Ca, Iron, Ni, Si), insufficient brine feed (too low level of Cl in the reactor), loss of feed caustic flow, membrane blistering, membrane fooling (plugging), membrane piercing. This list is not exhaustive. All of these events will have an effect on the performance of the electrolyser. Often, they will lead to a voltage increase and a decrease in current efficiency. The following are simplified examples of rules that show how the recommendations are inferred in the knowledge base for the chlor-alkali technology. In the preferred embodiment of the invention, those rules are more elaborated:

$R_1$: If the voltage increases in all cell units and the set points remain constants=>it is recommended to an impurity level analysis.

$R_2$: If parameter b from the polarization curve increase and a and c doesn't=>event purely resistive in nature; recommendation: check if there is a fouling of the membrane or an increase in the hardware resistance.

$R_3$: If the oxygen level rise=>check if there is a blockage in that cell or a problem related to the membrane or the anode in that cell.

Similarly to the chlor-alkali industry, in the chlorate industry, there are many events or problems which will affect the process performance. The electrolyser is somewhat simplified because there is no membrane to separate the anodic reaction from the cathodic reaction. However, there is a chemical reaction taking place after the electrochemical step that is complicating the overall process. Examples of typical events or problems are: electrode separation from the carrier plate or back plate split, electrode assembly damage, crystallization between the cell electrodes, anode loss of coating, anode passivation, cathode blistering, cathode corrosion, cathode deactivation, heavy electrode deposits, blockage in cell or liquor circuit, valve closed between reactor and electrolyser, problem with crystalliser (loss in efficiency in removing $ClO_3$), problem with the brine purification (impurities such as Ca, Mg, sulphate, Co, Ni, Cu, etc), insufficient brine feed (too low level of Cl in the reactor). Here again, the recommendations rules are expressed in an "if-then" way.

In a PEM fuel cell, many factors can affect its performance. Carbon monoxide (CO) poisoning is a typical example. When CO is present in the hydrogen feed, it can adsorb on the platinum surface and block part of the surface that was available for hydrogen reaction. Some more examples of typical event and problems are: flooding of the anode or cathode backing layer, drying of the membrane, leakage of hydrogen around or through the membrane, membrane damage.

The above cited rules are reformulated and stored as symbolic if-then statements in the faults and events diagnosis knowledge base 35. Known in the art, rule base selectors as expert systems or fuzzy logic engines that can be used to infer the recommendations from the classification assignments in the diagnostic phase. In the learning phase, the user has entered the first set of rules based on the electrolyser technology prior knowledge. This first set of rules is then updated and fine-tuned when new events or situations occur. An interactive graphical user interface is used to help the user to well enter the rules according to the selected features and the classification assignments done by the state profiles classifier 33.

Figure 6:
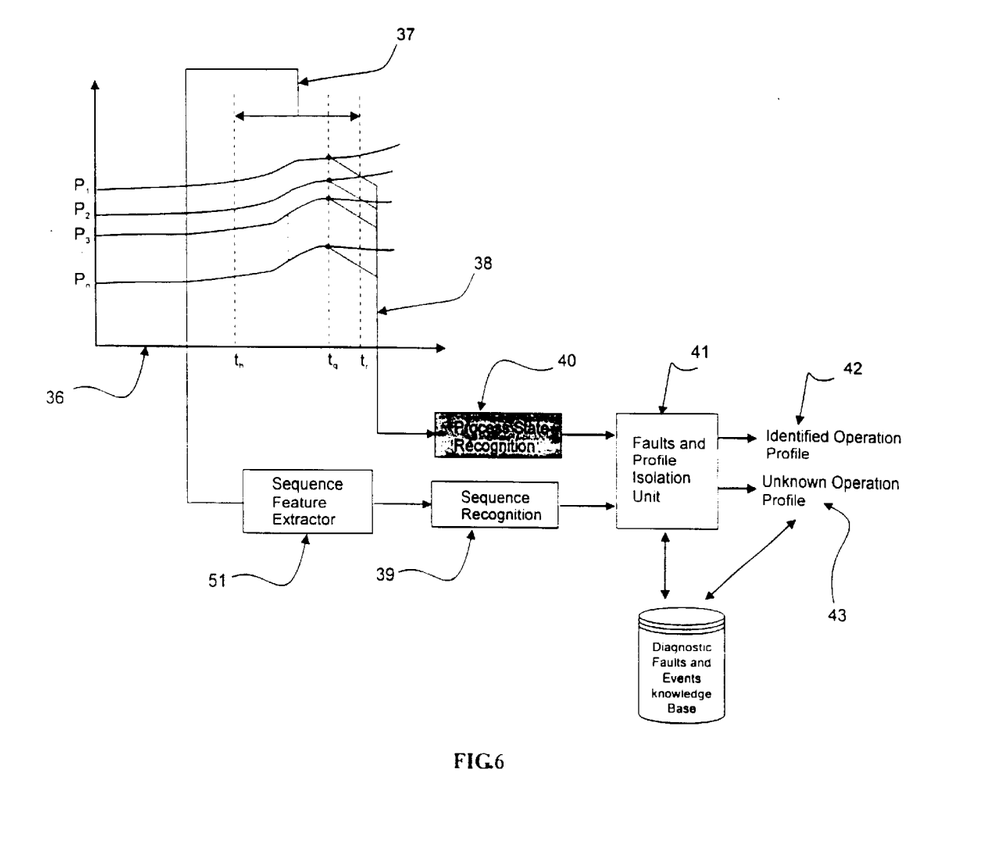
FIG. 6 shows the structure of the diagnostic feature extractor and the diagnostic faults and events validating unit shown in FIG. 3.

In FIG. 4, the diagnostic unit 26 contains two main components: the diagnostic feature extractor 19 which obtains the data measurements rows 18 from the data base and generates the adequate features to the other components, the diagnostic validating unit 28. The latter module identified the faults signatures and events in the input features based on the classification rules and recommendations stored in the diagnostic faults and events knowledge base during the learning phase. FIG. 6 details the interaction between the components of the diagnostic unit 26. In order to identify the faults and events learned in the training phase, the sequence feature extractor 51 performs in the time series sequence $P_i \in [t_h, t_r]$ 37 i.e. the same analysis and pre-processing operations as in 49. Multiple recognition operations are done, depending on the kind of the desired detection: instantaneous operation profile identification, the evolution of the global operation profile or the evolution of a local operation profile. In the simple case where an event is defined by the evolution of one parameter in a time window, the feature vector for the parameter in interest generated from the sequence feature extractor 51 is compared with the learned reference local features vectors stored in the fault and events knowledge base 35. The so-called "dynamic time warping algorithm" is used to compare the feature vector for the parameter Pi and the stored reference vectors to identify the local fault or event signature. This algorithm is implemented in the sequence recognition unit 39. It measures the similarity distance between the prototype feature vectors. By the mean of that distance measure, the faults and profiles isolation unit 41 chooses the suitable local recommendation rule for the most similar feature vector to the measured feature vector (More details about the dynamic time warping algorithm could be found in the publication entitled "Applied Pattern recognition", author: Dietrich W. P. Paulos, pp. 334–340, vieweg publications). The second detection level is the identification of the instantaneous state vector profile at the each step time tq. This operation is done by the process state recognition 40. This module calculates for each instantaneous state vector 38 a membership degree to the event classes maps in the learned two-dimensional grid. This membership degree is generated by mean of the maximum quantisation error. This error is the similarity distance between the measured state vector 38 and the learned training state vectors mapped into the two-dimensional classification grid 33. In other words, the quantisation error informs about the location of the input state vector in the learned map. In the preferred embodiment of the invention, the quantisation error is measured by the Euclidian distance. Furthermore, the history evolution of the global state vector in the time window $[t_h, t_r]$ 37, could be tracked by following the trajectory of the operation point in the classification grid map 33. Based on the classification degree or movement generated by the state recognition module 40, the fault and events isolation module infers the most suitable recommendations from the faults and events knowledge base. In the case where the matching degree to the learned features is poor, the parameters measurements input to the diagnosis unit are probably novel situations or events not learned in the training unit. As a result, the fault and events isolation unit generates a "Unknown event" message. The novel situation could be taken in account by updating the knowledge base. Thus, if this situation occurs in the future, it could be recognized. All the recommendations and events identifications are presented to the user by daily, weekly or monthly reports or by the graphical visualization of the operation points movement in the classification map grid.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A system for monitoring electrolyser performances in manufacturing processes and for identifying the operation profiles of a plurality of electrolysers, said apparatus comprising:
   a) a plurality of acquisition and transmission units, each of said acquisition and transmission units measuring a plurality of variables related to a respective electrolyser and for transmitting said variables;
   b) a database and data management unit for recording the variables transmitted by each of said acquisition and transmission units;
   c) an intelligent data analysis and fault diagnosis unit for analysing said variables and diagnosing events, said analysis and diagnosis unit comprising:
      (i) a learning unit comprising a learning feature extractor and a learning faults and event classifier, wherein the learning feature extractor generates an instantaneous state vector from a plurality of relevant variables and a feature matrix defined in a plant operation time window;
      (ii) a diagnosis unit; and
      (iii) an operation profiles knowledge base for inputting the classification assignments generated by the learning classifier and linking the same to operation recommendations using a rate-based system;
   wherein each of said units are interconnected through a communication unit.

2. The system according to claim 1, wherein each of said acquisition and transmission units comprises an acquisition electronic board for measuring said variables, a transmission device and a concentration device.

3. The system according to claim 1, wherein said variables include voltage, current and temperature.

4. The system according to claim 1, wherein said system further includes a monitoring unit, said monitoring unit comprising a multi level graphical user interface, where a basic level shows a plant layout with the monitored electrolysers and a higher level displays a plurality of measurement trends reflecting the evolution of said measurements in a time window.

5. The system according to claim 4, wherein said higher level further displays polarization curves, filtered signals and analysis reports generated from said intelligent data analysis and fault diagnosis unit.

6. The unit according to claim 1, wherein the feature matrix is generated by time analysis or frequency analysis or polarisation curves in said plurality of relevant data variables defined in a plant operation time window.

7. The unit according to claim 1, wherein said learning faults and events classifier inputs the feature and state vectors and maps the feature and state vectors on two dimensional map grid, classifying into the same clusters similar vectors that are associated to an event or operation profile based on the plant prior knowledge using a geometric classification algorithm.

8. The unit according to claim 1, wherein the diagnosis unit comprises: a sequence feature extractor unit, a sequence recognition unit, a process state recognition unit and a faults and profiles isolation unit.

9. The unit according to claim 8, wherein the sequence feature extractor unit generates for each variable a feature vector or feature matrix.

10. The unit according to claim 9, wherein the sequence recognition unit outputs a dissimilarity degree of the input feature vector to learned feature vectors by using a dynamic time warping algorithm.

11. The unit according to claim 9, wherein the process state recognition unit assigns to an instantaneous process state vector a membership degree to the classes learned in the two-dimensional grid trained in the learning phase where said classification degree is generated by calculating the similarity measure between the state vector in interest and the classified state vectors in the learning phase.

12. The unit according to claim 9, wherein the faults and profiles isolation unit takes into account the classification degrees calculated by both the sequence recognition unit and the state recognition unit and outputs the most suitable recommendations based on the rules stored in the operation profiles database.

13. The system according to claim 1, wherein said events include faults.

14. The system according to claim 1, wherein said monitoring unit further displays requested measured variables, alarms, pre-processed data and diagnosis reports through a user interface.

15. The system according to claim 1, wherein said intelligent data analysis and fault diagnosis unit is further adapted to learn pre-defined faults and operation profiles of said electrolysers and to prevent the occurrence of events.

16. The system according to claim 1, wherein said acquisition and transmission units are hermetically sealed.

17. The system according to claim 1, wherein said acquisition and transmission units are connected to said communications unit through optical fibers.

18. The system according to claim 1, wherein said electrolysers include chloralkali membrane electrolysers; chlorate electrolysers and PEM fuel cells.

19. A method for monitoring electrolyser performances and for diagnosing and predicting events in a manufacturing process which uses a plurality of electrolysers, comprising:
   a) measuring a plurality of variables with a plurality of acquisition and transmission units;
   b) monitoring and analysing said variables with an intelligent data analysis and fault diagnosis unit for diagnosing and predicting events based on rules, said analysis and fault diagnosis unit comprising:
      (i) a learning unit comprising a learning feature extractor and a learning faults and event classifier, wherein the learning feature extractor generates an instantaneous state vector from a plurality of relevant variables and a feature matrix defined in a plant operation time window;
      (ii) a diagnosis unit; and
      (iii) an operation profiles knowledge base for inputting the classification assignments generated by the learning classifier and linking the same to operation recommendations using a rate-based system; and
   c) displaying said variables and the diagnoses and predictions generated by said intelligent data analysis and fault diagnosis unit.

* * * * *